(12) United States Patent
Shinohara

(10) Patent No.: US 7,116,367 B2
(45) Date of Patent: Oct. 3, 2006

(54) SOLID-STATE IMAGE PICKUP APPARATUS HAVING A RESET TRANSISTOR CONTROLLED BY AN OUTPUT LINE

(75) Inventor: Mahito Shinohara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 490 days.

(21) Appl. No.: 09/935,589

(22) Filed: Aug. 24, 2001

(65) Prior Publication Data

US 2002/0024068 A1 Feb. 28, 2002

(30) Foreign Application Priority Data

Aug. 25, 2000 (JP) ............................. 2000-256356

(51) Int. Cl.
*H04N 3/14* (2006.01)
*H04N 5/335* (2006.01)
(52) U.S. Cl. .................................... 348/308
(58) Field of Classification Search ................ 348/294, 348/302, 308, 207.99; 250/208.1, 291, 292; 257/291, 292
See application file for complete search history.

(56) References Cited

U.S. PATENT DOCUMENTS

| | | | |
|---|---|---|---|
| RE34,309 E | 7/1993 | Tanaka et al. | 358/213.31 |
| 5,288,988 A | 2/1994 | Hashimoto et al. | 250/208.1 |
| 5,424,529 A | 6/1995 | Hashimoto et al. | 250/208.1 |
| 5,587,738 A | 12/1996 | Shinohara | 348/302 |
| 5,698,844 A | 12/1997 | Shinohara et al. | 250/214 R |
| 6,731,335 B1 * | 5/2004 | Kim et al. | 348/308 |

FOREIGN PATENT DOCUMENTS

| | | |
|---|---|---|
| JP | A-01-243675 | 9/1989 |
| JP | A-09-46596 | 2/1997 |
| JP | A-10-93066 | 4/1998 |
| JP | A-2000-224482 | 8/2000 |

* cited by examiner

*Primary Examiner*—Ngoc-Yen Vu
*Assistant Examiner*—Justin Misleh
(74) *Attorney, Agent, or Firm*—Fitzpatrick, Cella, Harper & Scinto

(57) ABSTRACT

To reduce the number of MOS transistors of a pixel and the number of gate potential control lines, the present invention provides a solid-state image pickup apparatus including a pixel including a photoelectric conversion unit, a read transistor for reading a signal from the photoelectric conversion unit, and a reset transistor for resetting the input portion of the read transistor, and an output line to which the signal from the read transistor is read out, wherein the reset transistor is controlled in accordance with the signal level of the output line.

6 Claims, 5 Drawing Sheets

SOLID-STATE IMAGE PICKUP APPARATUS HAVING A RESET TRANSISTOR CONTROLLED BY AN OUTPUT LINE

BACKGROUND OF THE INVENTION

1. Field of the Invention

The present invention relates to a solid-state image pickup apparatus and image pickup system and, more particularly, to a solid-state image pickup apparatus having a pixel including a photoelectric conversion unit, a read transistor for reading a signal from the photoelectric conversion unit, and a reset transistor for supplying a reset signal to the input portion to reset the input portion of the read transistor, and an image pickup system using such the apparatus.

2. Related Background Art

Conventionally, a CCD has been often used as a solid-state image pickup apparatus because of its high S/N ratio. On the other hand, a so-called amplification type solid-state image pickup apparatus that is advantageous in a simple manner of use or low power consumption has also been developed. An amplification type solid-state image pickup apparatus supplies signal charges accumulated in a light-receiving pixel to the control electrode of a transistor in the pixel unit and outputs an amplified signal from the main electrode. Examples of amplification type solid-state image pickup apparatus transistors are a SIT image sensor using a SIT (static induction transistor) as an amplification transistor, a BASIS using a bipolar transistor, a CMD using a JFET (junction field effect transistor) whose control electrode is depleted, and a CMOS sensor using a MOS transistor. Especially, extensive efforts have been made to develop a CMOS sensor because it satisfactorily matches with a CMOS process and can form a peripheral CMOS circuit on one chip.

FIG. 4 is a circuit diagram showing a conventional CMOS image sensor. The FIG. 4 illustrates 2×2 pixels for simplification. The sensor includes a unit pixel 1, a photodiode 2 for receiving light and accumulating signal charges, a signal charge amplification MOS transistor 3, a transfer MOS transistor 4 for transferring the signal charges accumulated in the photodiode 2 to the gate electrode unit of the MOS transistor 3, a reset MOS transistor 5 for resetting the gate electrode potential of the MOS transistor 3, and a power supply potential supply line 6 to which the drain electrode of the reset MOS transistor 5 and that of the amplification MOS transistor 3 are commonly connected. The sensor also has a selection switch MOS transistor 7 for selecting an output pixel, and a pixel output line 8. When the selection switch MOS transistor 7 is turned on, the source electrode of the amplification MOS transistor 3 is electrically connected to the output line 8, and the signal output from a selected pixel is supplied to the output line 8. A constant current supply MOS transistor 9 supplies the amplification MOS transistor 3 with a load current through the pixel output line 8 and the selection switch MOS transistor 7 of a selected pixel to make the amplification MOS transistor 3 with operate as a source follower and to output a potential having a predetermined voltage difference from the gate potential of the MOS transistor 3 to the output line 8.

A transfer control line 10 controls the gate potential of the transfer MOS transistor 4. A reset control line 11 controls the gate potential of the reset MOS transistor 5. A selection control line 12 controls the gate potential of the selection MOS transistor 7. A constant potential supply line 13 supplies a predetermined potential to the gate of the MOS transistor 9 such that the MOS transistor 9 performs a saturation region operation and serves as a constant current source. A pulse terminal 14 supplies a transfer pulse to the transfer control line 10. A pulse terminal 15 supplies a reset pulse to the reset control line 11. A pulse terminal 16 supplies a selection pulse to the selection control line 12. A vertical scanning circuit 17 sequentially selects the rows of pixels arrayed in a matrix. Output lines 18 of the vertical scanning circuit 17 comprise a first row selection output line 18-1 and a second row selection output line 18-2. A switch MOS transistor 19 supplies a pulse from the pulse terminal 14 to the transfer control line 10. A switch MOS transistor 20 supplies a pulse from the pulse terminal 15 to the reset control line 11. A switch MOS transistor 21 supplies a pulse from the pulse terminal 16 to the selection control line 12. The gates of the MOS transistors 19, 20, and 21 are connected to the row selection output line 18-1. The state of the row selection output lines 18-1 and 18-2, determines the row on which pixels become active.

The sensor also includes an readout circuit 22 for reading out an output from a pixel, a capacitor 23 for holding a reset signal output from a pixel, a capacitor 24 for holding a photo signal output from a pixel, a switch MOS transistor 25 for connecting/disconnecting the pixel output line 8 to/from the capacitor 24, a noise output line 27 to which the reset output held by the capacitor 23 is supplied, a signal output line 28 to which the optical output held by the capacitor 24 is supplied, a switch MOS transistor 29 for connecting/disconnecting the capacitor 23 to/from the noise output line 27, a switch MOS transistor 30 for connecting/disconnecting the capacitor 24 to/from the signal output line 28, a noise output line reset MOS transistor 31 for resetting the potential of the noise output line 27, a signal output line reset MOS transistor 32 for resetting the potential of the signal output line 28, a power supply terminal 33 for supplying a reset potential to the source electrodes of the reset MOS transistors 31 and 32, a horizontal scanning circuit 34 for sequentially selecting the capacitors 23 and 24 which are arranged for each column of pixels arrayed in a matrix, an output line 35-1 for selecting the first column, and an output line 35-2 for selecting the second column. The output lines of the horizontal scanning circuit 34 are connected to the switch MOS transistors 29 and 30. A pulse supply terminal 36 applies a pulse to the gates of the reset MOS transistors 31 and 32. Pulse supply terminals 37 and 38 apply pulses to the gates of the switch MOS transistors 25 and 26, respectively. A differential amplifier 39 amplifies and outputs the voltage difference between the potential of the noise output line 27 and that of the signal output line 28. The differential amplifier 39 has an output terminal 40.

The operation of the sensor shown in FIG. 4 will be described next with reference to the timing chart shown in FIG. 5. Note that all MOS transistors shown in FIG. 4 are NMOS transistors which are turned on when the gate potential is at high level and off at low level. Numerals indicating timing pulses in FIG. 5 correspond to the reference numerals of pulse input terminals in FIG. 4.

When the row selection output line 18-1 goes high upon operation of the vertical scanning circuit 17, operation of the first row of the pixel matrix is enabled. When the pulse terminal 16 goes high, the source of the amplification MOS transistor 3 of each pixel is connected to the constant current supply 9 through the output line 8, so the source follower output of the pixel is output to the output line 8. When the pulse terminal 15 goes high, the gate portion of the amplification MOS transistor 3 is reset by the reset MOS transistor 5. When a High pulse is applied to the pulse supply terminal 37 next, the reset output of the pixel is accumulated in the capacitor 23 through the MOS transistor 25.

When a High pulse is applied to the terminal 14, signal charges accumulated in the photodiode 2 are transferred to the gate of the MOS transistor 3 through the transfer MOS transistor 4. Subsequently, when a High pulse is applied to the terminal 38, an output in which a signal is superposed on the reset output of the pixel is accumulated in the capacitor 24 through the MOS transistor 26. Th reset output of the pixel varies because the threshold voltage of the MOS transistor 3 varies among the pixels. Hence, the difference between the outputs accumulated in the capacitors 23 and 24 is a pure signal free from noise. When the horizontal scanning circuit 34 is operated, the output lines 35-1 and 35-2 sequentially go high, and the outputs accumulated in the capacitors 23 and 24 of each column are supplied to the horizontal output lines 27 and 28 through the MOS transistors 29 and 30, respectively. Before the High pulses from the output lines 35-1 and 35-2 are output, the terminal 36 is set at high level to reset the horizontal output lines 27 and 28 through the MOS transistors 31 and 32 in advance. The pixel reset output and the signal output superposed on the pixel reset level, which are supplied to the horizontal output lines 27 and 28, are input to the differential amplifier 39. A pixel signal obtained by subtracting the reset level, i.e., a pixel signal free from noise is output from the output terminal 40.

In the prior art, however, since the number of MOS transistors of one pixel and the number of control lines are large, a small pixel in size is hard to realize. That is, in the prior art shown in FIG. 4, one pixel has four MOS transistors and three control lines in addition to a photodiode, power supply line, and pixel output line. Unlike a pixel of a CCD with a simple arrangement, size reduction is hard for CMOS sensors.

SUMMARY OF THE INVENTION

It is an object of the present invention to easily reduce the pixel size.

In order to achieve the above object, according to an aspect of the present invention, there is provided a solid-state image pickup apparatus comprising:

a pixel including a photoelectric conversion unit, a read transistor for reading a signal from the photoelectric conversion unit, and a reset transistor for resetting an input portion of the read transistor; and an output line to which the signal from the read transistor is read out, wherein the reset transistor is controlled in accordance with a signal level of the output line.

According to another aspect of the present invention, there is provided a solid-state image pickup apparatus comprising:

a plurality of pixels arrayed in horizontal and vertical directions, each pixel including a photoelectric conversion unit, a read transistor for reading a signal from the photoelectric conversion unit, and a reset transistor for controlling a control electrode area to reset an input portion of the read transistor, thereby turning on/off the read transistor; and a signal line for supplying a predetermined signal level to operate the read transistor, wherein the signal line is connected to one of main electrode areas of the reset transistor, and the signal line independently supplies a signal on a unit basis of the plurality of pixels in a horizontal direction.

The above and other objects, features, and advantages of the present invention will become apparent from the following description in conjunction with the accompanying drawings.

DETAILED DESCRIPTION OF THE PREFERRED EMBODIMENTS

The characteristic features of the embodiments of the present invention will be described with reference to FIG. 1. As the first characteristic feature of the present invention, a pixel output line 8 is connected to the gate of a reset MOS transistor 5, thereby omitting a row selection MOS transistor and its gate potential control line, and the gate potential control line of the reset MOS transistor.

In the above arrangement, the pixel output line also serves as a reset control line for controlling the potential of the pixel output line and turning on/off the reset MOS transistor when the gate of the amplification transistor is to be reset to the power supply line potential. As the second characteristic feature, a reset potential supply line connected to the drain portion of the reset MOS transistor 5 is also used as a power supply line connected to the drain portion of an amplification MOS transistor 3 serving as a read-out means. The potential of the power supply line is changed independently for each row. In the reset operation, the reset potential supply line of an unselected row is set to a potential for setting the amplification transistor in an cutoff state, and the power supply line of a selected row is set to a potential for setting the amplification transistor in an active state. With the setting and control of the pixel output line and power supply line, the gate potential control line of the reset MOS transistor, the row selection MOS transistor and its gate potential control line of the prior art can be omitted, and the pixel size can be reduced.

The embodiments of the present invention will be described below in detail with reference to the accompanying drawings.

Figure 1:
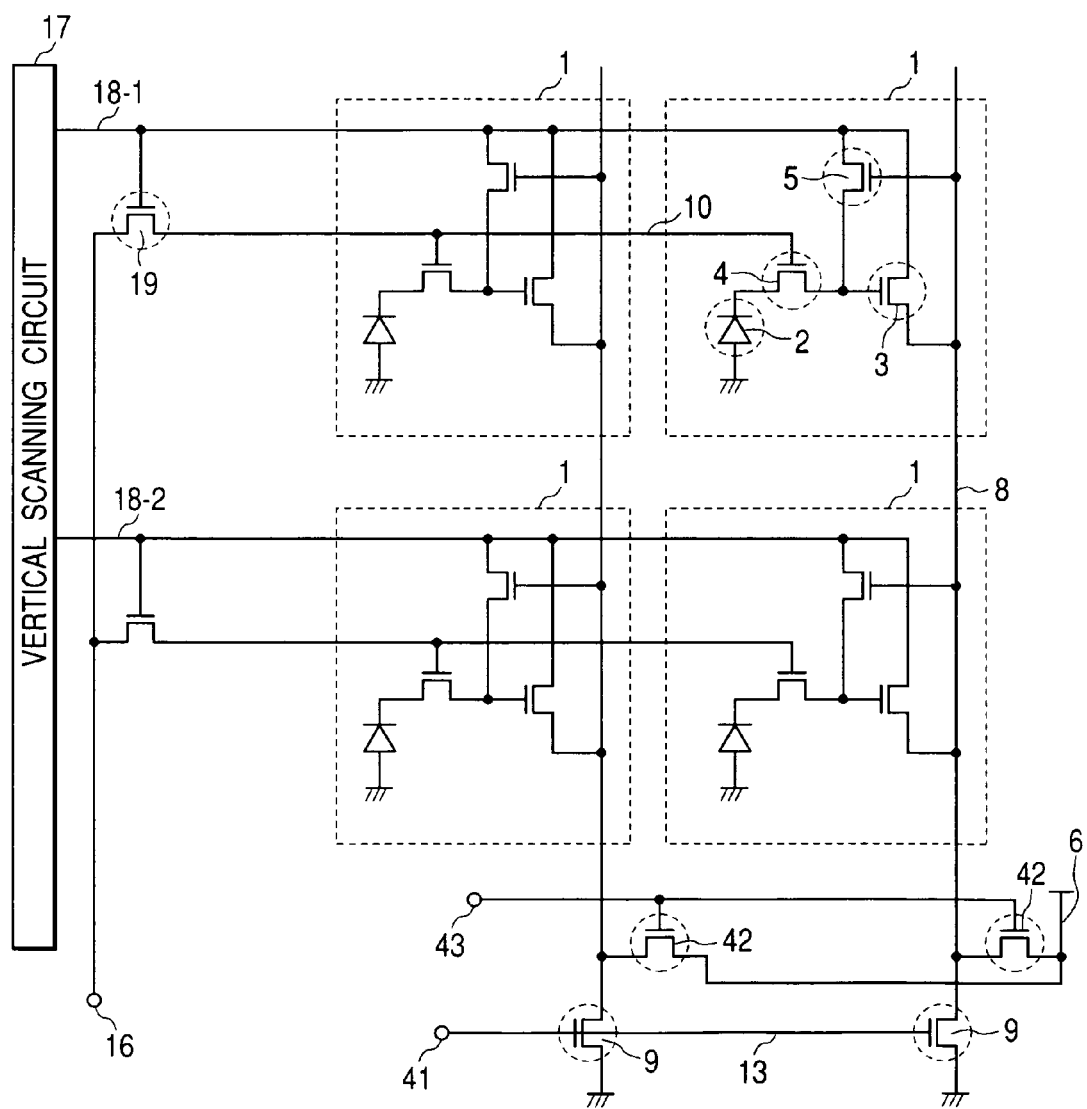
FIG. 1 is a circuit diagram showing the first embodiment of the present invention.
Figure 4:
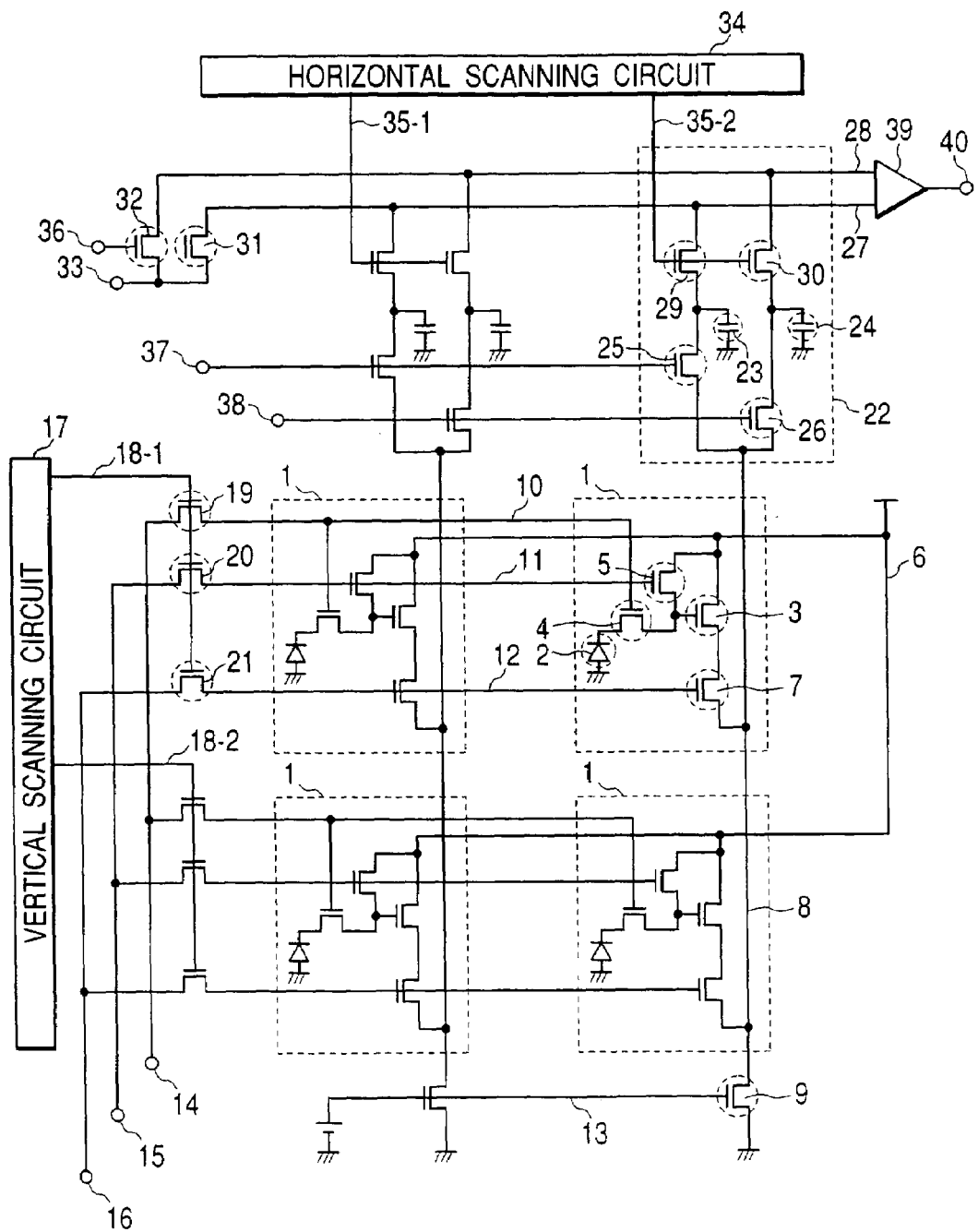
FIG. 4 is a circuit diagram showing a conventional solid-state image pickup apparatus.

FIG. 1 is a circuit diagram showing the first embodiment of the present invention. This embodiment is related to a pixel arrangement and pixel operation. The read circuit and horizontal scanning system are the same as in the prior art shown in FIG. 4 and therefore are not illustrated. Only the pixel layout portion, vertical scanning system, and pixel output line potential control circuit of a 2×2 pixel solid-state image pickup apparatus are shown. The same reference numerals as in FIG. 4 denote the same parts in FIG. 1, and a description thereof will be omitted.

Referring to FIG. 1, a control terminal 41 supplies a potential to the gate of a constant current supply MOS transistor 9 of a pixel source follower to ON/OFF-control the constant current. A MOS transistor 42 controls the potential of a pixel output line 8. A pulse input terminal 43 controls the gate potential of the MOS transistor 42. The pixel output line 8 of each column is connected to the gate of a reset MOS transistor 5 of each pixel of that column. The drain of the reset MOS transistor 5 and that of an amplification MOS transistor 3 are commonly connected to the output line of a vertical shift register (vertical scanning circuit) 17. Output lines 18-1 and 18-2 of the vertical shift register have a large current supply capability because they serve as a power supply of the pixel source follower of each row.

Note that the MOS transistors shown in FIG. 1 are NMOS transistors except the MOS transistor 42, which are turned on when the gate potential is at high level and off at low level. The MOS transistor 42 is a PMOS transistor which is turned off when the gate potential is at high level and turned on at low level.

Figure 5:
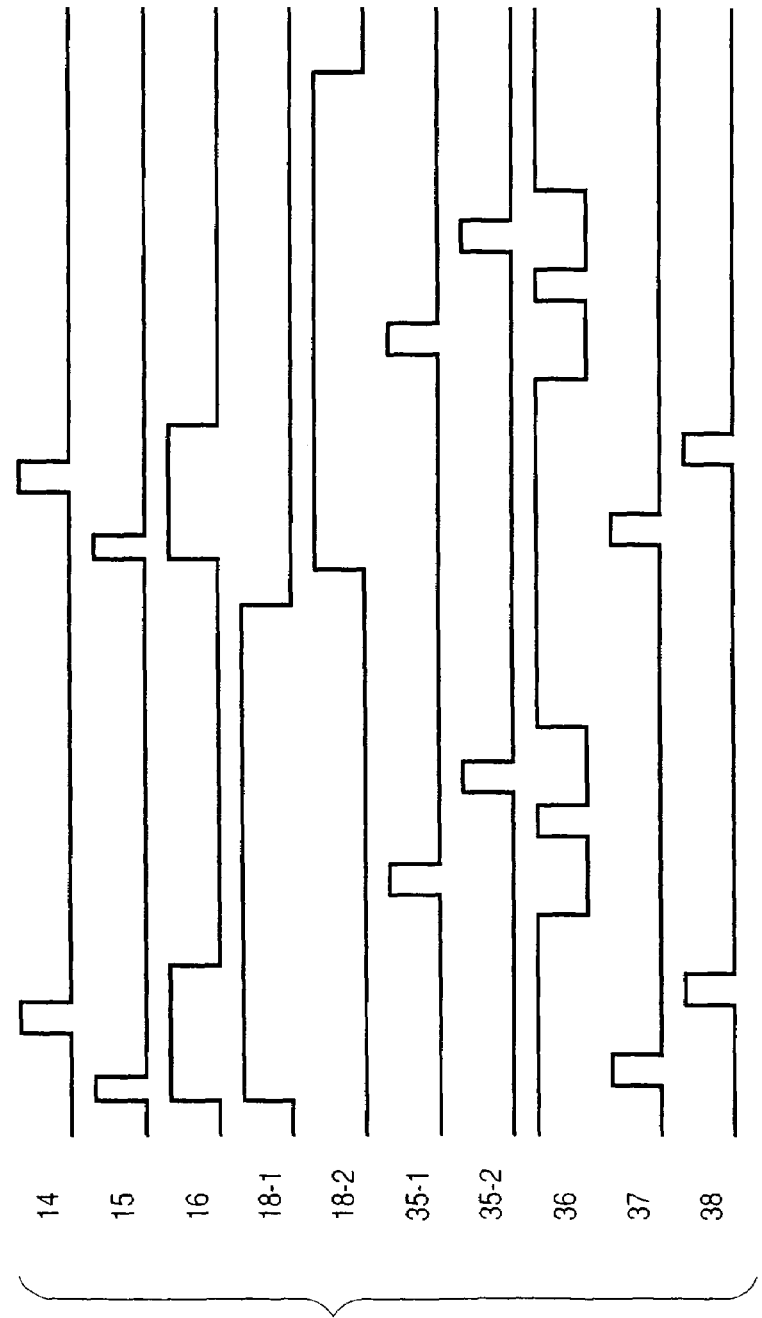
FIG. 5 is a timing chart of the solid-state image pickup apparatus shown in FIG. 4.

The operation of this embodiment will be described next. The operation of this embodiment is different from the prior art described with reference to FIGS. 4 and 5 only in the reset operation before reading pixel signals of one row. In the reset operation, the terminals 41 and 43 are set at low level to turn off the MOS transistor 9 and turn on the PMOS transistor 42, thereby setting the potential of the pixel output line 8 at high level. At this time, the reset MOS transistor 5 is turned on. In accordance with the output from the vertical shift register, the gate potential of the amplification MOS transistor 3 of a pixel of a selected row is reset to high level, and the gate potential of the amplification MOS transistor 3 of a pixel of an unselected row is reset to low level. Next, the potential of the terminal 41 is set to make the MOS transistor 9 provide a constant current, and the potential of the terminal 43 is set at high level to turn off the MOS transistor 42. In this state, only the pixel source follower of the selected row operates, and the reset output of the pixel is read out to the output line 8. A series of operations such as accumulating the reset output in the read circuit, transferring signal charges in a photodiode 2 to the gate of the MOS transistor 3, and accumulating the reset+signal output in the read circuit are the same as those described with reference to FIGS. 4 and 5.

Referring to FIG. 1, the output from the vertical shift register is used as the reset potential supply source of each row. However, an output through a buffer circuit having a high current supply capability may be used. In the above operation, the drive circuit may be set such that the reset potential supply line goes high when the pixels are reset, and the signal of a selected pixel is output to the pixel output line. At this time, the potential of the pixel output line is low, and the gate potential of the MOS transistor 3 does not become so high as to turn on the MOS transistor 3 of a pixel of an unselected row.

According to the above-described first embodiment, since the number of MOS transistors of a pixel and the number of control lines are decreased compared to the prior art, a smaller pixel can easily be realized.

Figure 2:
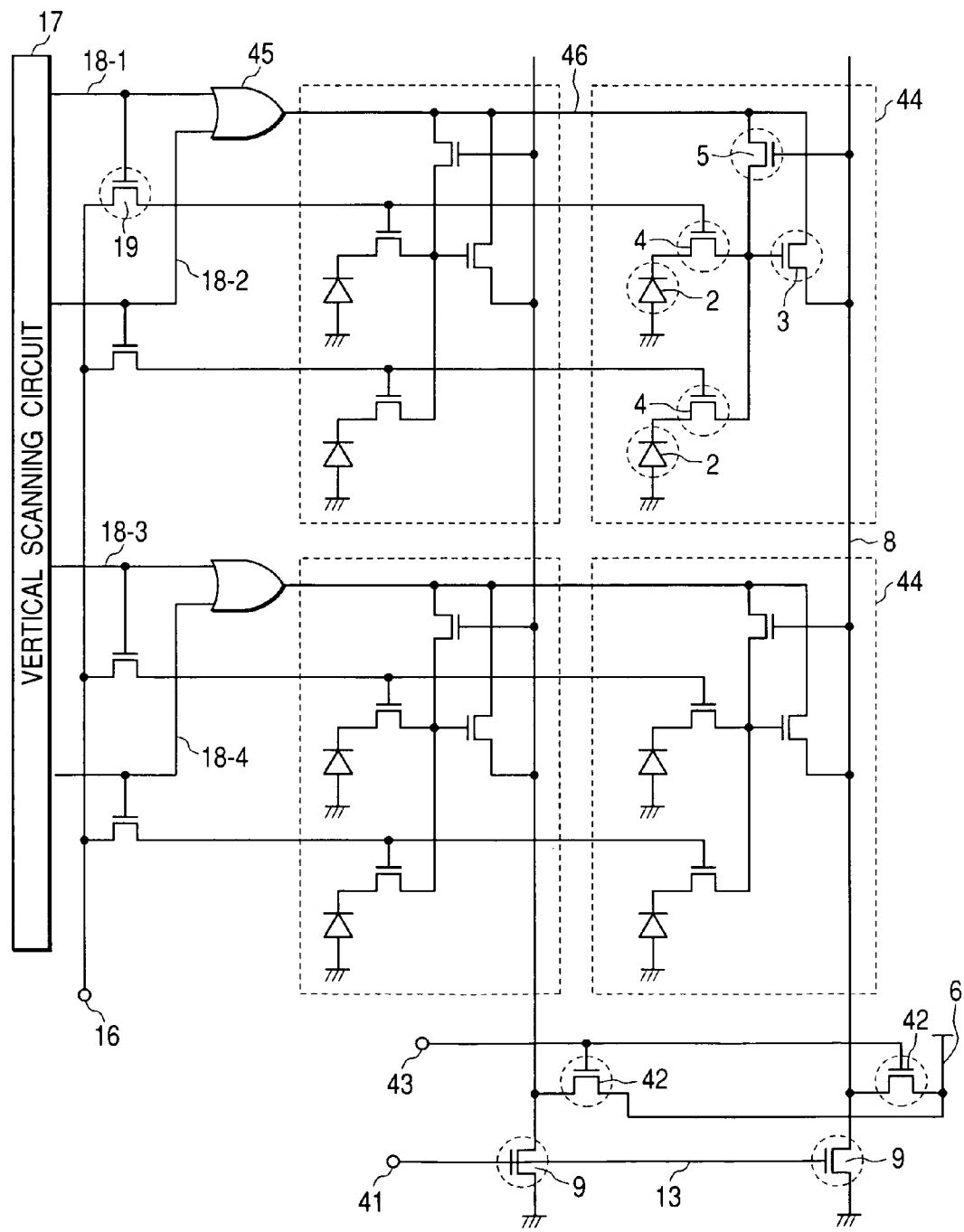
FIG. 2 is a circuit diagram showing the second embodiment of the present invention.

FIG. 2 is a circuit diagram showing the second embodiment of the present invention. This embodiment is related to a pixel arrangement and pixel operation. The read circuit and horizontal scanning system are the same as in the prior art shown in FIG. 4 and therefore are omitted. Only the pixel layout portion, vertical scanning system, and pixel output line potential control circuit of a two-dimensional solid-state image pickup apparatus having 4 rows×2 columns are shown. The same reference numerals as in FIGS. 1 and 4 denote the same components in FIG. 2, and a description thereof will be omitted.

Referring to FIG. 2, a unit pixel 44 includes two photodiodes adjacent in the column direction. Since the photodiodes are independent, the unit pixel 44 corresponds to two pixels of the image pickup apparatus. Signal charges accumulated in the two photodiodes are transferred to the gate portion of a common amplification MOS transistor 3. As in FIG. 1, a pixel output line 8 of each column is connected to the gate of a reset MOS transistor 5 of each pixel of that column. As in FIG. 1, the drain of the reset MOS transistor 5 and that of the amplification MOS transistor 3 are commonly connected. In the matrix layout of the photodiodes, one reset & power supply line is prepared every two rows. Outputs 18-1, 18-2, 18-3, and 18-4 of a vertical shift register 17 select the photodiodes of the first, second, third, and fourth rows for a read-out, respectively. An OR gate 45 receives two output lines of the vertical shift register. An output line 46 of the OR gate 45 serves as a reset & power supply line of the unit pixel 44. The potential of supply line 46 of a unit pixel to which selected pixels connect goes high. The power supply line 46 has a sufficient current supply capability.

Note that the MOS transistors shown in FIG. 2 are NMOS transistors except a MOS transistor 9, which are turned on when the gate potential is at high level and off at low level. Only the MOS transistor 9 is a PMOS transistor which is turned off when the gate potential is at high level and turned on at low level.

The operation of the arrangement of this embodiment will be described next. A series of operations of resetting the gate of a selected MOS transistor 3 by a high potential, simultaneously resetting the gate of an unselected MOS transistor 3 by a low potential, reading the reset output, transferring signal charges in a selected photodiode, and reading (reset+signal) output are the same as those of the first embodiment. The second embodiment is different from the first embodiment only in that since two photodiodes are assigned to one unit pixel, one unit pixel is continuously selected for two rows selection, and a detailed description thereof will be omitted.

According to the above-described second embodiment, since the number of MOS transistors of a pixel and the number of control lines are decreased further compared to that of the first embodiment, a small pixel can easily be realized. In the second embodiment, a unit pixel includes two photodiodes. The embodiment is still effective for the unit pixel including more than two photodiodes.

The n- and p-types of MOS transistors and the polarity of each drive pulse in the first and second embodiments may be reversed.

A image pickup system using the solid-state image pickup apparatus of the first or second embodiment will be described next with reference to FIG. 3.

Figure 3:
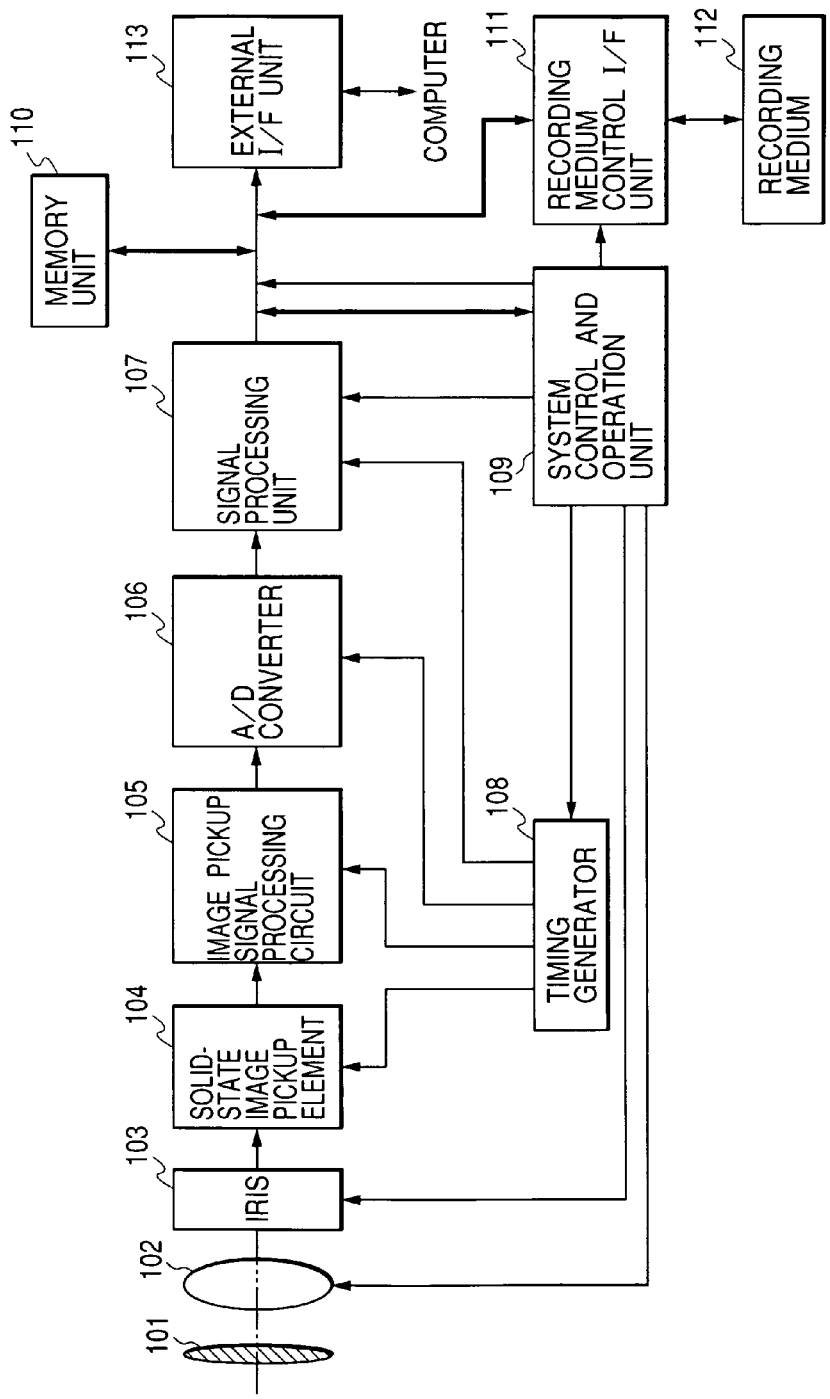
FIG. 3 is a block diagram showing an example in which a solid-state image pickup apparatus of the present invention is applied to an image pickup system.

Referring to FIG. 3, the image pickup system has a barrier 101 serving as the protection and main switch of a lens, a lens 102 for forming an optical image of an object onto a solid-state image pickup apparatus 104, an iris 103 for changing the amount of light transmitted through the lens 102, the solid-state image pickup apparatus 104 for receiving the object image formed by the lens 102 as an image signal, an A/D converter 106 for performing analog-to-digital conversion of the image signal output from the solid-state image pickup apparatus 104, a signal processing unit 107 for performing various kinds of correction for the image data output from the A/D converter 106 or compressing the data, a timing generation unit 108 for outputting various kinds of timing signals to the solid-state image pickup apparatus 104, image pickup signal processing circuit 105, A/D converter 106, and signal processing unit 107, a system control and operation unit 109 for performing various kinds of operations and controlling the entire still video camera, a memory unit 110 for temporarily storing the image data, an interface unit 111 for recording/reading out the image data on/from a recording medium, a detachable recording medium 112 such as a semiconductor memory for recording or reading out image data, and an interface unit 113 for communicating with an external computer or the like.

The operation of the still video camera with the above-described arrangement in the phototaking mode will be described next.

When the barrier 101 is opened, the main power supply is turned on, the power supply of the control system is turned on next, and finally, the power supply of the image pickup system circuit such as the A/D converter 106 is turned on.

To control the exposure amount, the system control and operation unit 109 sets the iris 103 to the full-aperture state. The signal output from the solid-state image pickup apparatus 104 is converted by the A/D converter 106 and is then input to the signal processing unit 107. The system control and operation unit 109 calculates for exposure adjustment on the basis of the data, and control the iris.

On the basis of the signal output from the solid-state image pickup apparatus 104, a high-frequency factor is extracted, and the distance to the object is calculated by the system control and operation unit 109. After that, the lens is driven, and it is determined whether an in-focus state is obtained or not. If the state is out of focus, the lens is driven again, and distance measurement is performed.

After confirming the in-focus state, main exposure starts. When exposure is ended, the image signal output from the solid-state image pickup apparatus 104 is converted to digital signal by the A/D converter 106, passes through the signal processing unit 107, and is written in the memory unit by the system control and operation unit 109. After that, the data stored in the memory unit 110 is recorded on the detachable recording medium 112 such as a semiconductor memory through the recording medium control I/F unit under the control of the system control and operation unit 109. The image data may be directly input to a computer or the like through the external I/F unit 113 to process the image.

As has been described above, according to the embodiments, the number of components of a pixel, and in, e.g., a CMOS sensor, the number of MOS transistors and gate potential control lines can be reduced as compared to the prior art, and the pixel size can easily be reduced.

Many widely different embodiments of the present invention may be constructed without departing from the spirit and scope of the present invention. It should be understood that the present invention is not limited to the specific embodiments described in the specification, except as defined in the appended claims.

What is claimed is:

1. A solid-state image pickup apparatus comprising:
   a pixel including a photoelectric conversion unit, a read transistor for reading a signal from said photoelectric conversion unit, and a reset transistor for resetting an input portion of said read transistor; and
   an output line to which the signal from the read transistor is read out, said output line being connected to a control electrode area of the reset transistor so that said control electrode area is supplied with a signal level of said output line,
   wherein the reset transistor is controlled to be turned on and off by changes in the signal level of said output line.

2. An apparatus according to claim 1, further comprising a control transistor connected to said output line to control the signal level of said output line.

3. An apparatus according to claim 1, wherein the read transistor and reset transistor are MOS transistors.

4. An apparatus according to claim 1, further comprises a transfer switch arranged between the photoelectric conversion unit and the read transistor,
   wherein signal charges accumulated in the photoelectric conversion unit are transferred to the input portion of the read transistor through said transfer switch.

5. An apparatus according to claim 1, wherein a plurality of transfer switches are connected to the input portion of the read transistor, and signal charges are independently transferred from a plurality of photoelectric conversion units by said transfer switches.

6. An image pickup system comprising:
   said solid-state image pickup apparatus of claim 1;
   an optical system adapted to form an image of light onto said solid-state image pickup apparatus; and
   a signal processing circuit adapted to process an output signal from said solid-state image pickup apparatus.

* * * * *

UNITED STATES PATENT AND TRADEMARK OFFICE
CERTIFICATE OF CORRECTION

| | | |
|---|---|---|
| PATENT NO. | : 7,116,367 B2 | Page 1 of 1 |
| APPLICATION NO. | : 09/935589 | |
| DATED | : October 3, 2006 | |
| INVENTOR(S) | : Shinohara et al. | |

It is certified that error appears in the above-identified patent and that said Letters Patent is hereby corrected as shown below:

On the title page,

[*] Notice: Subject to any disclaimer, the term of this patent is extended or adjusted under 35 USC 154(b) by (490) days Delete the phrase "by 490 days" and insert -- by 577 days--

Signed and Sealed this

Third Day of April, 2007

JON W. DUDAS
*Director of the United States Patent and Trademark Office*